(12) United States Patent
Berkey

(10) Patent No.: US 8,947,526 B2
(45) Date of Patent: Feb. 3, 2015

(54) VIDEO SURVEILLANCE SYSTEM HAVING COMMUNICATION ACKNOWLEDGEMENT NOD

(75) Inventor: Thomas F. Berkey, Tavernier, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 2138 days.

(21) Appl. No.: 11/947,943

(22) Filed: Nov. 30, 2007

(65) Prior Publication Data

US 2008/0136909 A1    Jun. 12, 2008

Related U.S. Application Data

(60) Provisional application No. 60/873,379, filed on Dec. 7, 2006.

(51) Int. Cl.
| | |
|---|---|
| *H04N 7/18* | (2006.01) |
| *H04N 5/232* | (2006.01) |
| *G05B 19/4062* | (2006.01) |
| *G08B 13/196* | (2006.01) |
| *H02H 7/085* | (2006.01) |

(52) U.S. Cl.
CPC ............ *H04N 5/232* (2013.01); *G05B 19/4062* (2013.01); *G08B 13/1963* (2013.01); *G05B 2219/42288* (2013.01); *H02H 7/0856* (2013.01)
USPC ......................................................... 348/143

(58) Field of Classification Search
USPC .................................... 348/61, 143, E07.085
See application file for complete search history.

(56) References Cited

U.S. PATENT DOCUMENTS

| | | | | |
|---|---|---|---|---|
| 6,509,926 | B1 * | 1/2003 | Mills et al. .................... | 348/143 |
| 7,868,911 | B2 * | 1/2011 | Park .............................. | 348/143 |
| 2003/0175023 | A1 * | 9/2003 | Suh ................................ | 396/90 |
| 2006/0098092 | A1 * | 5/2006 | Park .............................. | 348/143 |
| 2008/0101789 | A1 * | 5/2008 | Sharma ........................ | 396/427 |

FOREIGN PATENT DOCUMENTS

| | | |
|---|---|---|
| EP | 1381003 A1 | 1/2004 |
| JP | 9-74554 | 3/1997 |
| JP | 2006-186739 A | 7/2006 |

(Continued)

OTHER PUBLICATIONS

International Search Report dated Jul. 23, 2008 from International Application No. PCT/US2007/025026, International Filng Date Dec. 6, 2007.

(Continued)

*Primary Examiner* — Umar Cheema
(74) *Attorney, Agent, or Firm* — Christopher & Weisberg, P.A.

(57) ABSTRACT

The present invention provides a system and method for controlling a motor in a video surveillance system including a video camera, a tilt motor operable to move the video camera in a tilt direction, a pan motor operable to move the video camera in a pan direction, and a controller in electrical communication with the tilt and pan motors. The controller assesses an operational condition of the video surveillance system and, if the assessment is successful, actuates at least one of the tilt motor and pan motor to move the video camera along a first predetermined motion pattern. In addition, if the assessment is unsuccessful, the controller actuates at least one of the tilt motor and pan motor to move the video camera along a second predetermined motion pattern.

14 Claims, 5 Drawing Sheets

(56) References Cited

FOREIGN PATENT DOCUMENTS

| JP | 2008-5253 A | 10/2008 |
|---|---|---|
| WO | 01/41428 A1 | 6/2001 |

OTHER PUBLICATIONS

Office Action dated Feb. 19, 2013, issued in Japanese Patent Application Serial No. 2009-540303, (3 Pages).

1st Canadian Examination Report dated May 7, 2014 for corresponding Canadian Application Serial No. 2,671,809, Canadian Filing Date: Jun. 5, 2009, consisting of 3 pages.

Japanese Examination Report in both Japanese and its English translation dated Jan. 7, 2014 for corresponding Japanese National Stage Application Serial No. 2009-540303, consisting of 6 pages.

* cited by examiner

VIDEO SURVEILLANCE SYSTEM HAVING COMMUNICATION ACKNOWLEDGEMENT NOD

CROSS-REFERENCE TO RELATED APPLICATION

This application is related to and claims priority to U.S. Provisional Patent Application Ser. No. 60/873,379, filed Dec. 7, 2006, entitled Video Dome and System, the entirety of which is incorporated herein by reference.

STATEMENT REGARDING FEDERALLY SPONSORED RESEARCH OR DEVELOPMENT n/a

FIELD OF THE INVENTION

The invention relates to video surveillance systems, and in particular, toward a system and method for verifying video surveillance functionality and operation.

BACKGROUND OF THE INVENTION

In a large percentage of video surveillance system installations, in order to install or replace a video camera dome, an installation crew often must use a man-lift or very tall ladder to reach the elevated positions of one or more video components. Video camera domes often include integrated hardware and diagnostic components for sending and receiving operational information across a network. When a particular video camera dome is installed, it typically will go through a "home-up" or calibration procedure, and then look for activity on a connected communication network, which can be running any one of multiple protocols. When the video camera dome detects a proper command stream over one of the networks, it may report the type of protocol and/or command stream found as overlaid text in a video stream communicated to and displayed in a control room monitor. To verify that the dome is installed and communicating properly, an installer would normally communicate with someone in the control room who would watch for the communication acknowledgement message on the monitor and/or verify communication with the dome by sending a movement command from the control room to the video camera dome.

As stated above, video camera domes often include integrated hardware and diagnostic components, which may provide the capability to detect when the camera dome is receiving a recognized communication from a controller. Even when the dome is not receiving a command to move, a dome controller typically sends out polling commands to look for alarm activity or some other indicative event. Many existing domes also run internal diagnostics and overlay any status indications and/or errors onto a video stream output. As such, in addition to having an installer at the location of a video camera dome, current systems also require someone present on the receiving end of the video stream, such as in a control room or other secondary location, to verify functionality and/or operational condition of an installed camera. If an installer could verify that the dome was communicating properly and successfully passed diagnostic checks at the site of camera installation without requiring a second person elsewhere, the installation could be performed quicker and at a lower cost.

Previous solutions for this problem include the use of a light emitting diode ("LED") on the video camera dome itself, readily visible to an installer, to indicate proper communication or functionality. However, this approach is not without disadvantages. An LED or similar visible element on the video camera dome that is readily visible to the installer is also visible to customers, as well as potential thieves. Security personnel monitoring an area with the video camera dome obviously do not want potential thieves they are tracking to easily recognize which direction the dome is pointed towards. To reduce the likelihood of such circumstances, video camera domes are generally designed as smooth globes that conceal the lens assembly and other components of the device. Nevertheless, a visible LED that moved around with the globe, and thus indicates the position of the camera, would still reduce the capacity of security personnel to inconspicuously monitor a particular location.

In view of the above, it is desirable to provide a video surveillance system having the ability to verify communication and/or an operational condition at the site of a video camera dome without the need for additional personnel at a secondary location, while maintaining the advantage of inconspicuously tracking and/or monitoring a selected area of interest.

SUMMARY OF THE INVENTION

The present invention advantageously provides a method and system for verifying video surveillance functionality and operation at the site of a particular video camera dome. In particular a system for controlling a motor in a video surveillance system is provided, including a controller assessing an operational condition of the video surveillance system and actuating the motor to move in a predetermined motion pattern based at least in part upon the assessment. The motor may be actuated to move in the predetermined motion pattern if the assessment is successful, and the controller may actuate the motor to move in a different predetermined motion pattern if the assessment is unsuccessful. The assessment of the operational condition may include verification of communication with a monitoring station, receipt of a valid polling command, and/or verification of a command checksum.

The present invention also provides a video surveillance system having a video camera, a tilt motor operable to move the video camera in a tilt direction, a pan motor operable to move the video camera in a pan direction, a controller in electrical communication with the tilt and pan motors. The controller may assess an operational condition of the video surveillance system and actuate at least one of the tilt motor and pan motor to move the video camera along a predetermined motion pattern based at least in part upon the assessment. At least one of the tilt motor and pan motor may be actuated to move the camera along the predetermined motion pattern if the assessment is successful. In addition, the predetermined motion pattern may include actuation of the tilt motor only. The first controller may also actuate at least one of the tilt motor and pan motor to move the video camera along a different predetermined motion pattern if the assessment is unsuccessful, where the different predetermined motion pattern may include actuation of the pan motor only. The assessment of the operational condition may include verification of communication with a monitoring station, receipt of a polling command, and/or verification of a command checksum.

The present invention also includes a method of operating a video camera surveillance system, including assessing an operational condition of the video surveillance system and actuating one or more video camera motors to move a video camera along a predetermined motion pattern based at least in part upon the assessment. The one or more video camera motors may be actuated to move the video camera along the predetermined motion pattern if the assessment is successful, and the method may also include actuating the one or more video camera motors to move the video camera along a different predetermined motion pattern if the assessment is unsuccessful. The assessment of the operational condition may include verification of a valid network connection, receipt of a polling command, and/or verification of a command checksum.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
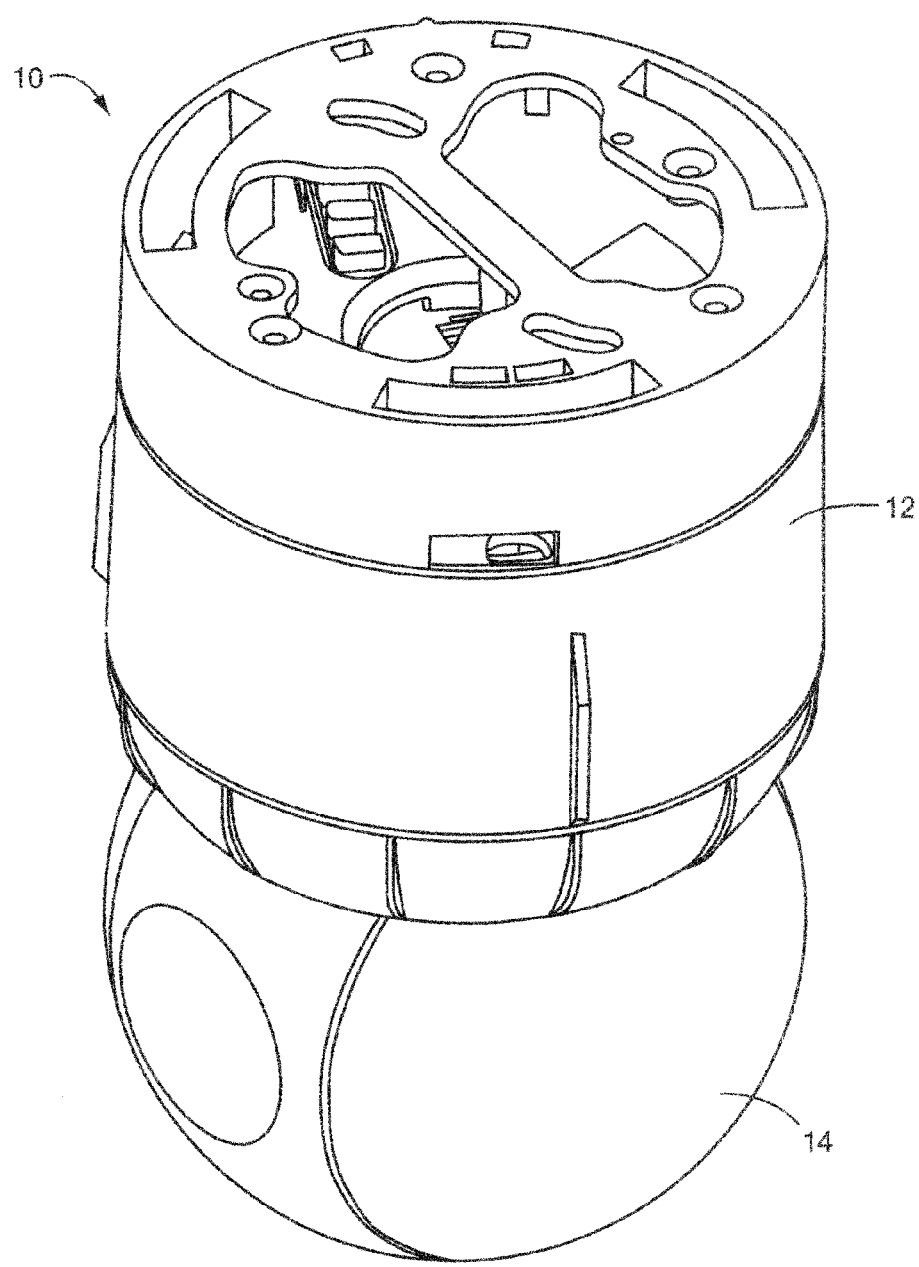
FIG. 1 is an illustration of a video surveillance system constructed in accordance with the principles of the present invention.

The present invention provides a video surveillance system and a method for operation or verification of the functionality thereof. Referring now to the drawing figures in which like reference designators refer to like elements, there is shown in FIG. 1, a video surveillance system constructed in accordance with the principles of the present invention and designated generally as "10". The video surveillance system 10 may generally include a housing assembly 12 in operative communication with a camera assembly 14, each of which may contain various mechanical and electrical components facilitating the operation thereof.

Figure 2:
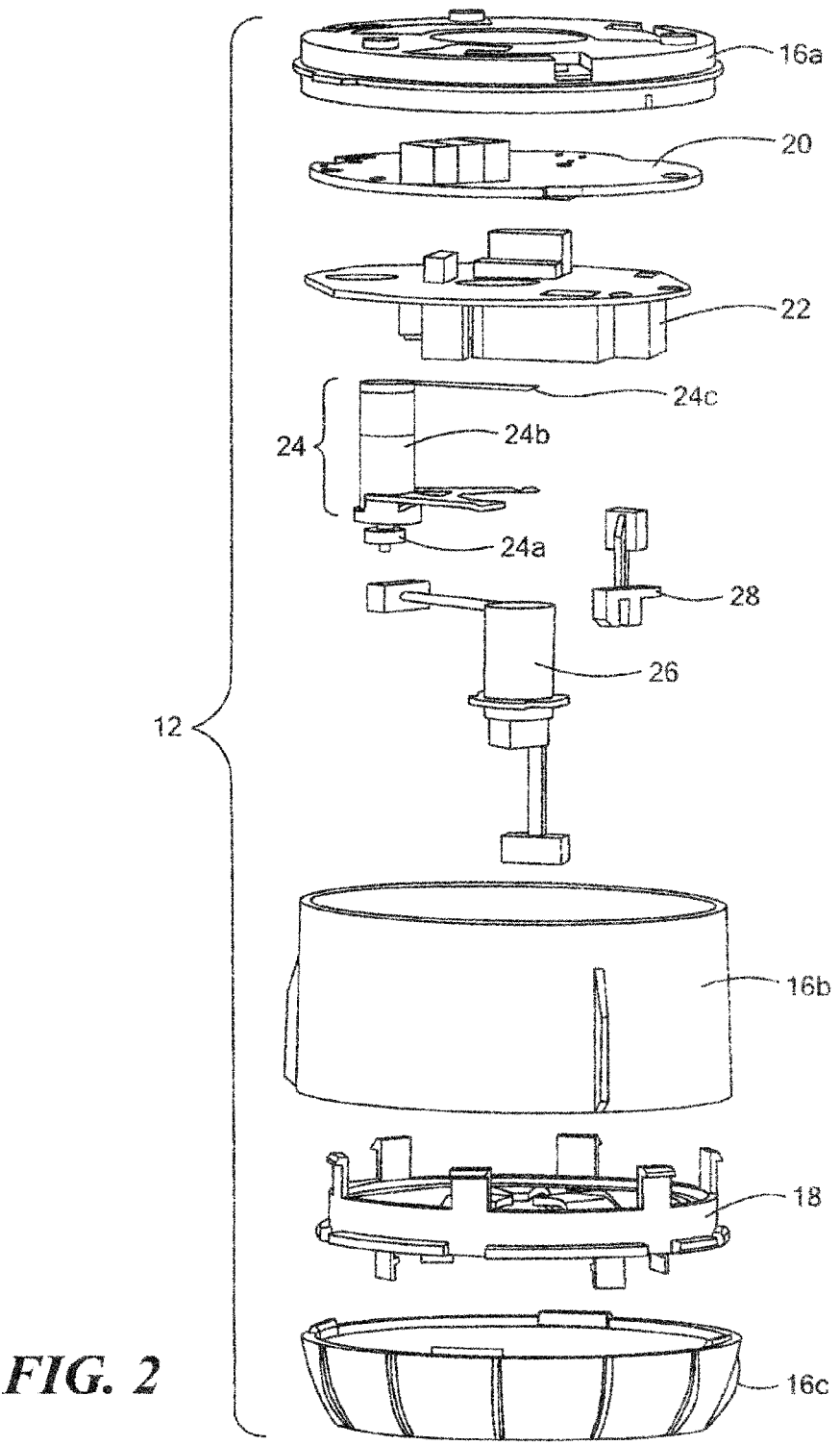
FIG. 2 is an exploded view of a housing assembly of the video surveillance system of FIG. 1.

Now referring to FIG. 2, in particular, the housing assembly 12 may include one or more housing elements 16a, 16b, 16c (referred to collectively herein as housing elements 16) encasing or otherwise enclosing a portion of the housing assembly contents. The housing elements 16 may be movably engaged to one another by a rotatable bearing pan platform 18 or similar mechanical coupling. The housing assembly 12 may further include a PC or CPU board 20 and a power supply 22 coupled to a pan motor 24. The CPU board 20 may include one or more processors, memory components, controllers, and/or a communications interface (not shown) for receiving, storing and/or executing commands or input from a remote location and for driving the pan motor 24. The power supply 22 may include a power source, such a battery or the like, and/or may further include electrical components for receiving and appropriately converting AC power from an external source to power the components described herein. The pan motor 24 may include a DC motor having the desired form factor and/or dimensions positionable within the housing assembly while having sufficient torque output to controllably move the desired components of the video surveillance system.

The housing assembly 12 of the video surveillance system 10 may further include motor assembly 24 having a gear train 24a coupled to a pan motor 24b and an encoder 24c, where the motor assembly 24 imparts, transfers, or otherwise conveys the output of the motor 24 to additional portions of the video surveillance system 10 to produce the desired movement. In particular, the encoder 24c may include a mechanical or optical incremental rotary encoder used to indicate movement of either the gear train 24a or the pan motor 24b. The movement indication can be used to determine the relative pan position of the camera assembly 24 as well as to actuate the pan motor 24 to move a portion of the housing assembly 12 and/or the camera assembly 14 along a desired motion pattern or series of controlled movements. In addition, a slip-ring assembly 26 may also be included in the housing assembly 12 and may further be coupled to the rotatable bearing platform 18 and housing element 16c to both provide an electrical connection to the pan platform, as well as enable the platform to move in an unlimited number of contiguous 360° revolutions. The housing assembly may also include an optical sensor 28 for monitoring the home position of the housing assembly 12 during operation.

Figure 3:
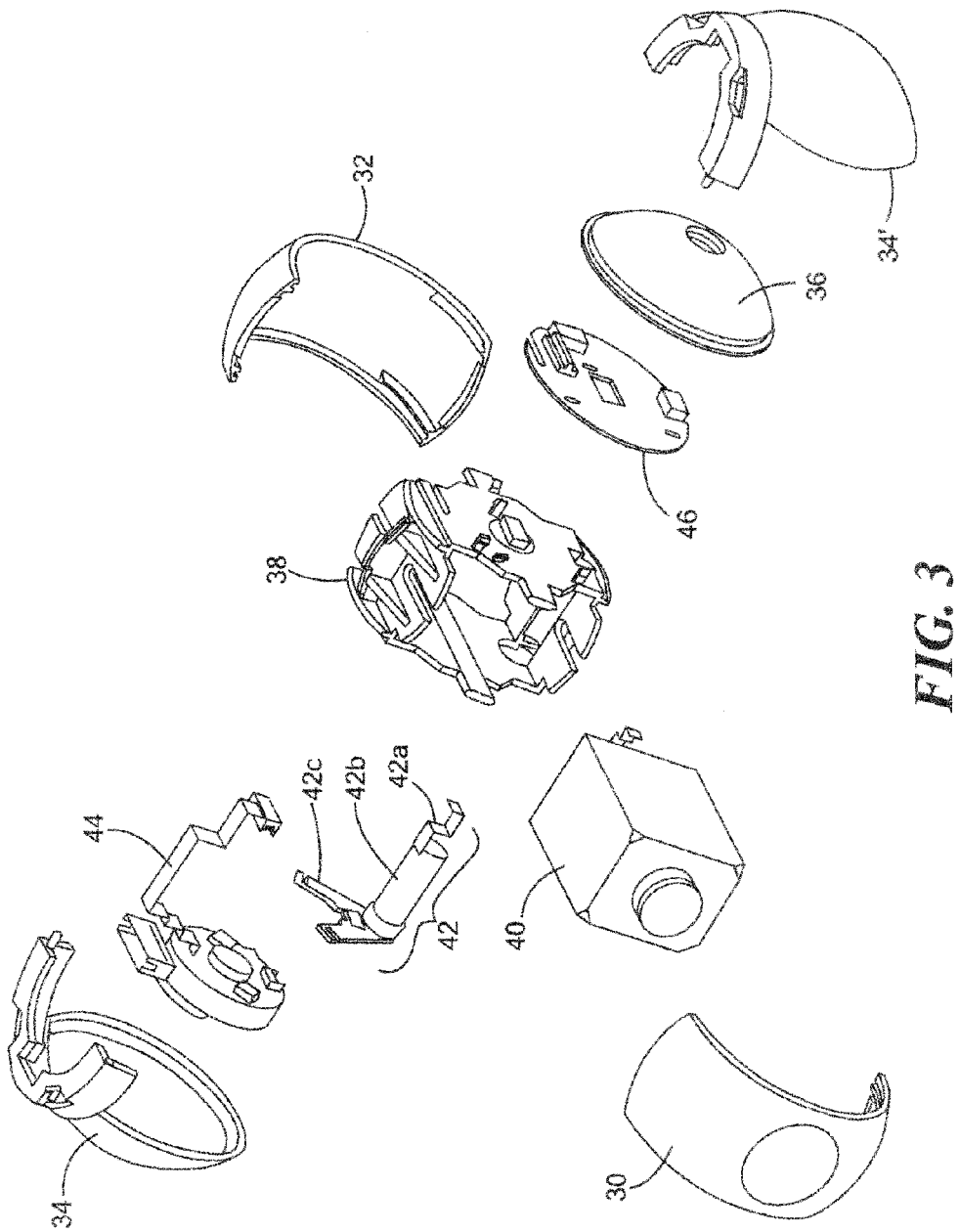
FIG. 3 is an exploded view of a camera assembly of the video surveillance system of FIG. 1.

As shown in FIG. 3, the camera assembly 14 of the video surveillance system 10 of the present invention may generally include one or more camera housing elements able to form a shell or cavity to contain or otherwise enclose additional components of the assembly. For example, there may be a front 30, rear 32, and two side 34, 34' camera housing elements engageable with one another, where one or more of the housing elements are rotatably or otherwise movably coupled to the others by a bearing component 36 and a tilt gear/bearing assembly 44. The camera assembly 14 may also include a camera cradle or yoke 38 able to receive a camera 40 securely therein. The camera 40 may include any device able to capture a visual image, including but not limited to color cameras, black and white cameras, digital capture devices, etc.

A tilt motor assembly 42 having a tilt encoder 42a, a tilt motor 42b, and a tilt gear train 42c may be disposed within the camera assembly 14. In addition, a PC board 46 may also be included in the camera assembly 14 within the housing. The tilt motor 42b may be mechanically coupled to the camera cradle 38 for movement thereof, while the tilt encoder 42a may be similar to the pan encoder 24c described above with respect to the pan motor assembly 24, i.e., the encoder may include a mechanical or optical incremental rotary encoder for monitoring the rotation or movement of the tilt motor 42b. The PC board 46 may include one or more electrical components, processors, memory components, controllers, cable connectors and/or drivers (not shown) for receiving, storing, and/or conveying commands to and driving the tilt motor assembly 42, as well as for receiving, storing, and/or transmitting images generated by the camera 40.

Figure 4:
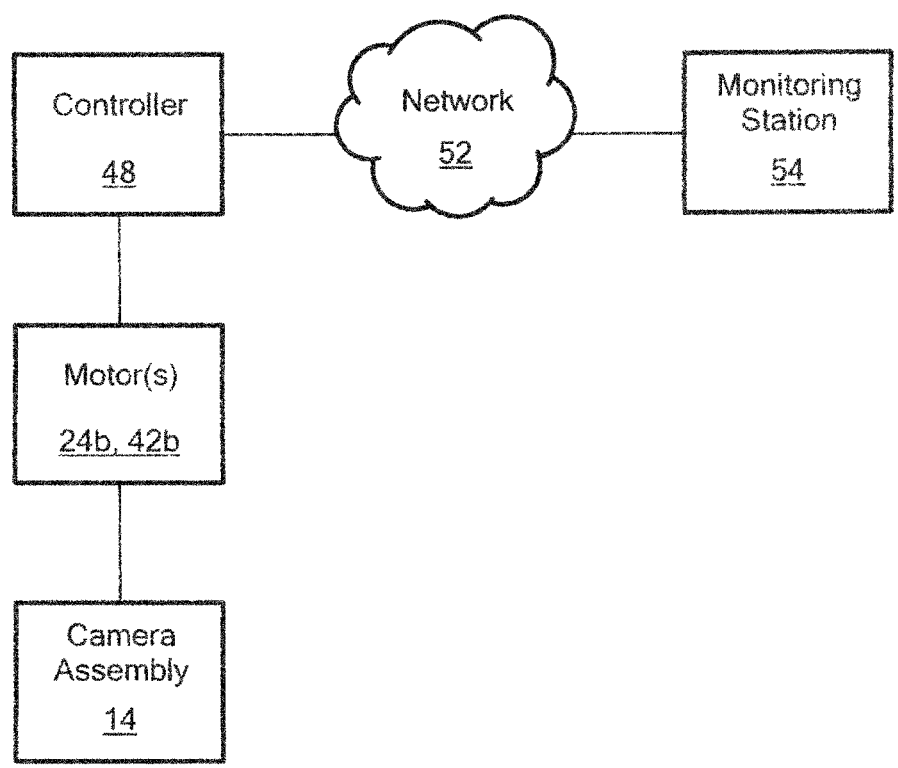
FIG. 4 is a block diagram of a video surveillance system constructed in accordance with the principles of the present invention.

Now referring to FIG. 4, an operational schematic illustrating an improved system and method for operating the video surveillance system illustrated in FIGS. 1-3 is shown. In particular, the system includes a controller 48 operably and/or electrically coupled to one or more motors, such as the pan motor 24b and tilt motor 42b described above, for moving or positioning the camera assembly 14. The controller 48 may include a micro-controller, processor or other device able to send and receive signals and/or commands during operation of the video surveillance system, and to further control or otherwise actuate the one or more motors of the system in response to the sent and/or received signals. The controller 48 may further include an electronic storage component (not shown) for storing commands, signals, executable instructions, scripts or the like employed during operation. In addition, the controller 48 may be coupled to a wired or wireless communication network 52 for sending and receiving signals or commands from a monitoring station 54, which may be at a remote secondary location from the camera assembly 14. Of note, the controller 48 and other electronic components described herein may be integrated or otherwise embodied within either and/or both of the PC/CPU boards 20, 46 described above. In addition, the hardware components described herein may also be contained within a ceiling mount engageable with a portion of the housing assembly and/or camera assembly at an installation site.

In an exemplary method of operating the video surveillance system of the present invention, a portion of the housing assembly 12 and/or camera assembly 12 may be moved along a predetermined motion pattern as an indication of the operational condition of the video surveillance system upon installation. In particular, upon installation of the video camera assembly in a video surveillance system or network, the controller 48 may attempt to detect, assess or otherwise verify the operational condition of one or more components of the video surveillance system and/or functions to be performed. As used herein, the term "operational condition" includes the ability or capacity of any component of the video surveillance system to successfully perform its intended function, and may include for example an assessment of network connectivity, signal strength, command receipt, command validity, power sufficiency, motor output, or the like. For example, the controller 50 may attempt to verify network connectivity of a particular camera to the network 52 and further, the monitoring station 54, where the verification attempt may continue for a predetermined time period before the attempt times out, thereby indicating a failure.

Depending on whether the verification is successful, the controller 48 may subsequently actuate the one or more motors 50 to move a portion of the camera assembly 14 along one or more predetermined motion patterns. For example, if the verification attempt is successful, one or two excursions of the camera assembly 14 on a tilt axis by the tilt motor 42 could indicate an affirmative nod or a "yes." Similarly, an unsuccessful verification attempt indicating some operational failure or diagnostic error could be indicated by excursions in the pan axis by the pan motor 24, similar to shaking your head to indicate "no." Of course, the predetermined motion patterns may include the actuation of one or more motors individually and/or in combination with one another to provide motion along one or more desired axes of movement.

Figure 5:
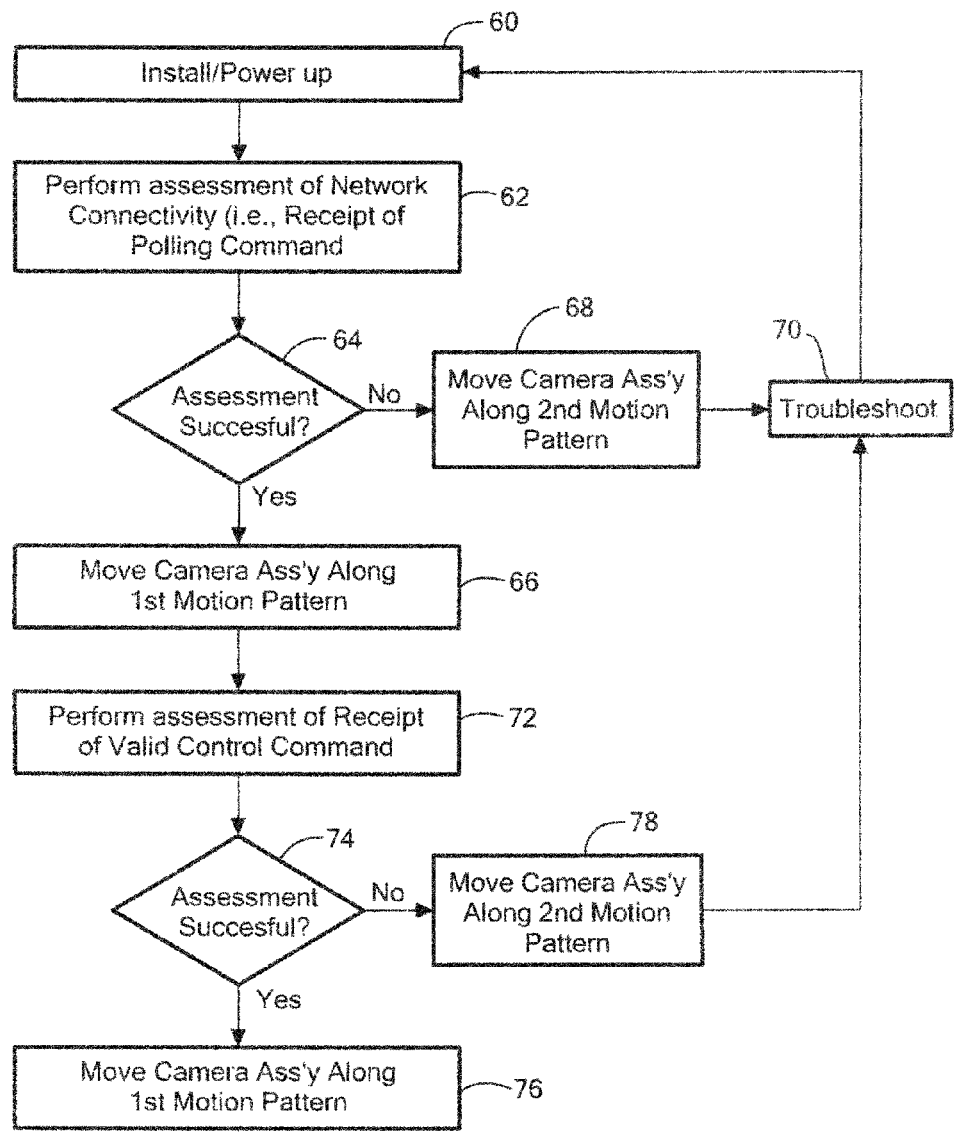
FIG. 5 is a flow chart of an embodiment of video surveillance system operation in accordance with the principles of the present invention.

Similar verification methodologies may be used to determine the receipt of one or more polling commands on a network; the validity of a command received from the network, which may include a checksum analysis or the like; as well as any other particular diagnostic or performance criteria present in the optimum operating conditions of the video surveillance system. For example, referring now to the flow chart of FIG. 5, an exemplary method of assessing the connectivity and functionality of a video surveillance system upon installation is shown. Initially, a component of the video surveillance system, such as the housing and camera assemblies, may be installed and powered on (Step 60). Upon powering up, an assessment of the network connectivity and/or communications ability of a portion of the video surveillance system may be performed (Step 62), for example, by checking for the receipt of a polling command, by pinging a known IP address, etc. Subsequently, a determination of whether the assessment was successful or not is made (i.e., was the operational condition satisfied) (Step 64). If the assessment was successful, a portion of the camera assembly is moved along a first motion pattern to visually indicate success to an installer (Step 66). If the assessment was unsuccessful, a portion of the camera assembly is moved along a second motion pattern to visually indicate failure to an installer (Step 68), and to allow for troubleshooting or other diagnostic efforts to be undertaken (Step 70). Instead or in addition to Steps 66-70, an assessment of the receipt of a valid control command from the monitoring station 54 may be performed to validate communications with the monitoring station 54 (Step 72). The assessment may include verification of a checksum of a received command, verification of an acceptable message, etc. Again, a determination of whether the assessment was successful or not is made (Step 74). If the assessment was successful, a portion of the camera assembly is moved along a first motion pattern, e.g. a tilt-based "nod," to visually indicate success to an installer (Step 76). If the assessment was unsuccessful, a portion of the camera assembly is moved along a second motion pattern, e.g. a pan-based "no," to visually indicate failure to an installer (Step 78), and to again allow for troubleshooting or other diagnostic efforts to be undertaken (Step 70). Of course, the particular motion patterns may vary, even from one assessment to another, to indicate success or failure at the different stages of installation or diagnostic procedures being undertaken to verify optimum functionality of the installed system. Moreover, a failure of a particular assessment may simply be indicated by the absence of movement or motion for the camera assembly.

The described system and method of correlating a predetermined motion pattern to either a successful or unsuccessful verification of the operation of the video surveillance system may be used in numerous diagnostic routines to assess functionality. A benefit of the video surveillance system and method of use thereof in accordance with the present invention is that it provides the capability of indicating a status of a video camera dome at its location without requiring additional personnel elsewhere and without the use of indicator LEDs, etc. Furthermore, the methodologies described herein may be readily integrated to existing systems by adding a few lines of software code required to issue the movement commands, for example, as existing systems often require similar lines of code and related driver circuitry for motor operation anyway. As such, a low cost, easily integrated system is provided for on-site verification of the functionality or operational condition of a component of a video surveillance system.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A system for controlling a motor in a video surveillance system, comprising:
a controller configured to:
assess an operational condition of the video surveillance system; and
actuate the motor to visibly indicate the outcome of the assessment of the operational condition of the video surveillance system by visibly moving a camera in a predetermined motion pattern during at least one of an installation phase and a diagnostic phase, the motor being actuated to move the camera in the predetermined motion pattern if the assessment is successful, and the motor being actuated to move the camera in a different predetermined motion pattern if the assessment is unsuccessful.

2. The system of claim 1, wherein assessment of the operational condition includes:
  verification of communication with a monitoring station; and
  receipt of a valid polling command.

3. The system of claim 1, wherein assessment of the operational condition includes receipt of a valid polling command.

4. The system of claim 1, wherein assessment of the operational condition includes verification of a command checksum.

5. A video surveillance system, comprising:
  a video camera;
  a tilt motor configured to move the video camera in a tilt direction;
  a pan motor configured to move the video camera in a pan direction; and
  a controller in electrical communication with the tilt and pan motors, the controller configured to:
    assess an operational condition of the video surveillance system; and
    actuate at least one of the tilt motor and pan motor to visibly indicate the outcome of the assessment of the operational condition of the video surveillance system by visibly moving the video camera along a predetermined motion pattern during at least one of an installation phase and a diagnostic phase, the at least one of the tilt motor and pan motor being actuated to move the camera along the predetermined motion pattern if the assessment is successful, and the at least one of the tilt motor and pan motor being actuated to move the video camera along a different predetermined motion pattern if the assessment is unsuccessful.

6. The video surveillance system of claim 5, wherein the predetermined motion pattern includes actuation of the tilt motor only.

7. The video surveillance system of claim 5, wherein the different predetermined motion pattern includes actuation of the pan motor only.

8. The video surveillance system of claim 5, wherein assessment of the operational condition includes:
  verification of communication with a monitoring station; and
  receipt of a valid polling command.

9. The video surveillance system of claim 5, wherein assessment of the operational condition includes receipt of a polling command.

10. The video surveillance system of claim 5, wherein assessment of the operational condition includes verification of a command checksum.

11. A method of operating a video camera surveillance system, comprising:
  assessing an operational condition of the video surveillance system; and
  actuating one or more video camera motors to visibly indicate the outcome of the assessment of the operational condition of the video surveillance system by visibly moving a video camera along a predetermined motion pattern during at least one of an installation phase and a diagnostic phase, at least one of the one or more video camera motors being actuated to move the video camera along the predetermined motion pattern if the assessment is successful, and at least one of the one or more video camera motors being actuated to move the video camera along a different predetermined motion pattern if the assessment is unsuccessful.

12. The method of claim 11, wherein assessment of the operational condition includes verification of a valid network connection.

13. The method of claim 11, wherein assessment of the operational condition includes receipt of a polling command.

14. The method of claim 11, wherein assessment of the operational condition includes verification of a command checksum.

* * * * *